(12) United States Patent
Mayer et al.

(10) Patent No.: US 7,235,776 B2
(45) Date of Patent: Jun. 26, 2007

(54) METHOD AND DEVICE FOR REGULATING A LIGHT SOURCE OF A POSITION-MEASURING UNIT

(75) Inventors: Elmar Mayer, Nussdorf (DE); Johann Oberhauser, Vachendorf (DE)

(73) Assignee: Johannes Heidenhain GmbH, Traunreut (DE)

( * ) Notice: Subject to any disclaimer, the term of this patent is extended or adjusted under 35 U.S.C. 154(b) by 142 days.

(21) Appl. No.: 10/927,689

(22) Filed: Aug. 27, 2004

(65) Prior Publication Data

US 2005/0052641 A1  Mar. 10, 2005

(30) Foreign Application Priority Data

Aug. 27, 2003 (DE) .................. 103 39 366

(51) Int. Cl.
*G01D 5/34* (2006.01)
*G01J 1/42* (2006.01)

(52) U.S. Cl. .................. 250/231.13; 356/222

(58) Field of Classification Search ........... 250/231.13; 356/222
See application file for complete search history.

(56) References Cited

U.S. PATENT DOCUMENTS

| 4,593,194 A | * | 6/1986 | Graham et al. | ........ | 250/231.16 |
| 5,015,836 A | * | 5/1991 | Van Antwerp | .............. | 250/205 |
| 6,344,641 B1 | * | 2/2002 | Blalock et al. | .............. | 250/205 |
| 6,380,352 B1 | * | 4/2002 | Sumner et al. | .............. | 528/480 |
| 6,492,637 B1 | * | 12/2002 | Fujita | ..................... | 250/231.13 |
| 2003/0234351 A1 | * | 12/2003 | Chee | ..................... | 250/231.13 |

FOREIGN PATENT DOCUMENTS

| DE | 27 30 056 | 1/1979 |
| EP | 0 591 832 | 4/1994 |
| GB | 2 054 135 | 5/2003 |
| JP | 05256665 | 10/1993 |
| JP | 07083612 | 3/1995 |
| JP | 2001311630 | 11/2001 |

* cited by examiner

*Primary Examiner*—Georgia Epps
*Assistant Examiner*—Kevin Wyatt
(74) *Attorney, Agent, or Firm*—Kenyon & Kenyon LLP

(57) ABSTRACT

A device for regulating a light source of a position-measuring unit includes: a measuring standard device that is movable relative to the light source; and a plurality of photodetectors, the photocurrent of at least one of the photodetectors usable as a basis for forming an actual value. The photodetectors are arranged such that light modulated by at least a partial number of the photodetectors of the measuring standard device is convertible into position-dependent photocurrents. In addition, the position-measuring unit includes a device for generating a setpoint value, and a comparator, by which a comparison between the actual value and the setpoint value may be made. By the generation device, the setpoint value is able to be generated based on the position-dependent photocurrents. A method is for performing such a regulation.

22 Claims, 2 Drawing Sheets

METHOD AND DEVICE FOR REGULATING A LIGHT SOURCE OF A POSITION-MEASURING UNIT

CROSS-REFERENCE TO RELATED APPLICATIONS

The present application claims priority to application No. 103 29 366.8, filed in the Federal Republic of Germany on Aug. 27, 2003, which is expressly incorporated herein in its entirety by reference thereto.

FIELD OF THE INVENTION

The present invention relates to a device for regulating a light source in a position-measuring unit and to a corresponding method.

BACKGROUND INFORMATION

Light sources are frequently used in position-measuring units, whose light is modulated as a function of position by an appropriate measuring standard device, for example, in the form of a scale or a graduated disk. Usually, the modulated light is converted by photodetectors into electrical photocurrents, so that the relative position between the light source and the measuring standard device is able to be ascertained from these position-dependent photocurrents.

In such position-measuring units it may happen that the light intensity changes with time, for example, that it diminishes because of aging of the light source during the course of the operating time. Because of the changes of the light intensity received by the photodetectors, regulation of the light source is frequently undertaken to improve measuring quality.

U.K. Published Patent Application No. 2 054 135 describes a method and a corresponding device for regulating such a light source. For this purpose, the sum of the position-dependent photocurrents is formed in a control circuit as the actual value of the light intensity. This actual value is then compared to a non-changeable, fixedly predefined setpoint value, in order thereby to ascertain the system deviation for regulating the light source. Such a regulating device has the disadvantage that when it gets dirty, e.g., in the case of soiling over large areas of the measuring standard device, no position-measuring or only an inaccurate or unstable one is possible.

SUMMARY

An example embodiment of the present invention may provide a device and a method by which position-measuring having great accuracy may be possible, e.g., that may be certain, robust and particularly insensitive to soiling.

According to an example embodiment of the present invention, the determining setpoint value for regulating a light source is generated based on position-dependent photocurrents, the position-dependent photocurrents created by conversion of modulated light of the light source using photodetectors. The actual value additionally required for the determination of the system deviation for the regulation of the light source is formed based on position-dependent, or even on position-independent photocurrents.

The photodetectors and a device for generating the setpoint value may be accommodated on the same ASIC.

In an example embodiment of the present invention, to ascertain the setpoint value, first of all electrical signals are digitized using an analog-to-digital converter, which are based on position-dependent photocurrents. Thereafter the digital values are processed further.

According to an example embodiment of the present invention, a device for regulating a light source of a position-measuring unit includes: a measuring standard device movable relative to the light source; a plurality of photodetectors configured to convert light emitted by the light source into photocurrents, the photocurrent of at least one photodetector usable to form an actual value, photodetectors arranged to convert light modulated by at least a partial number of the photodetectors into position-dependent photocurrents; a device configured to generate a setpoint value based on the position-dependent photocurrents; and a comparator configured to compare the actual value and the setpoint value to generate a system deviation for regulation of an intensity of the light source.

The device configured to generate the setpoint value may include a calculation module configured to form a vector length of signals that are based on the position-dependent photocurrents.

The device configured to generate the setpoint value may include an analog-to-digital converter configured to digitize signals that are based on the position-dependent photocurrents.

The device configured to generate the setpoint value may include a digital-to-analog converter configured to provide an analog setpoint value.

The photodetectors and the device configured to generate the setpoint value may be integrated in a semiconductor element.

According to an example embodiment of the present invention, a device for regulating a light source of a position-measuring unit includes: a measuring standard device movable relative to the light source; a plurality of photodetectors positioned to convert light modulated by the measuring standard device to position-dependent photocurrents, the position-dependent photocurrent of at least one photodetector usable to form an actual value; a device configured to generate a setpoint value based on the position-dependent photocurrents; and a comparator configured to compare the actual value and the setpoint value to generate a system deviation for regulation of an intensity of the light source.

The device configured to generate the setpoint value may include a calculation module configured to form a vector length of signals that are based on the position-dependent photocurrents.

The device configured to generate the setpoint value may include an analog-to-digital converter configured to digitize signals that are based on the position-dependent photocurrents.

The device configured to generate the setpoint value may include a digital-to-analog converter configured to provide an analog setpoint value.

The photodetectors and the device configured to generate the setpoint value may be integrated in a semiconductor element.

According to an example embodiment of the present invention, a device for regulating a light source of a position-measuring unit includes: a measuring standard device movable relative to the light source; a plurality of photodetectors arranged to convert light modulated by the measuring standard device into position-dependent photocurrents; a photodetector configured to convert light emitted by the light source to a position-independent photocurrent usable to form an actual value; a device configured to generate a setpoint value based on the position-dependent photocurrents; and a comparator configured to compare the actual value and the setpoint value to generate a system deviation for regulation of an intensity of the light source.

The device configured to generate the setpoint value may include a calculation module configured to form a vector length of signals that are based on the position-dependent photocurrents.

The device configured to generate the setpoint value may include an analog-to-digital converter configured to digitize signals that are based on the position-dependent photocurrents.

The device configured to generate the setpoint value may include a digital-to-analog converter configured to provide an analog setpoint value.

The photodetectors and the device configured to generate the setpoint value may be integrated in a semiconductor element.

According to an example embodiment of the present invention, a method for regulating a light source of a position-measuring unit includes: converting light emitted from the light source by photodetectors into photocurrents, at least one part of the emitted light modulated by a measuring standard device movable relative to the light source to generate position-dependent photocurrents by the modulated light and based on at least a partial number of the photodetectors; generating an actual value based on at least one of the photocurrents; generating a setpoint value based on the position-dependent photocurrents; and comparing the actual value to the setpoint value to generate a system deviation for regulating an intensity of the light source.

The actual value may be generated in the actual value generating step by an analog method.

The actual value may be generated in the actual value generating step based on a sum of the photocurrents.

The setpoint value generating step may include digitizing electrical signals that are based on the position-depending photocurrents.

The setpoint value generating step may include forming a vector length of electrical signals that are based on the position-dependent photocurrents.

The method may include: comparing the vector length to a predefined value of a setpoint vector length; and changing the setpoint value until a difference between the vector length and the setpoint vector length is between predefined limits.

The setpoint value generating step may include performing a digital-to-analog conversion of digitized values after the digitizing step and after further processing to generate the setpoint value.

Further details and aspects of the device according to the present invention and the corresponding method for regulating a light source of a position-measuring unit are set forth in the following description of exemplary embodiments with reference to the appended Figures.

DETAILED DESCRIPTION

Figure 1:
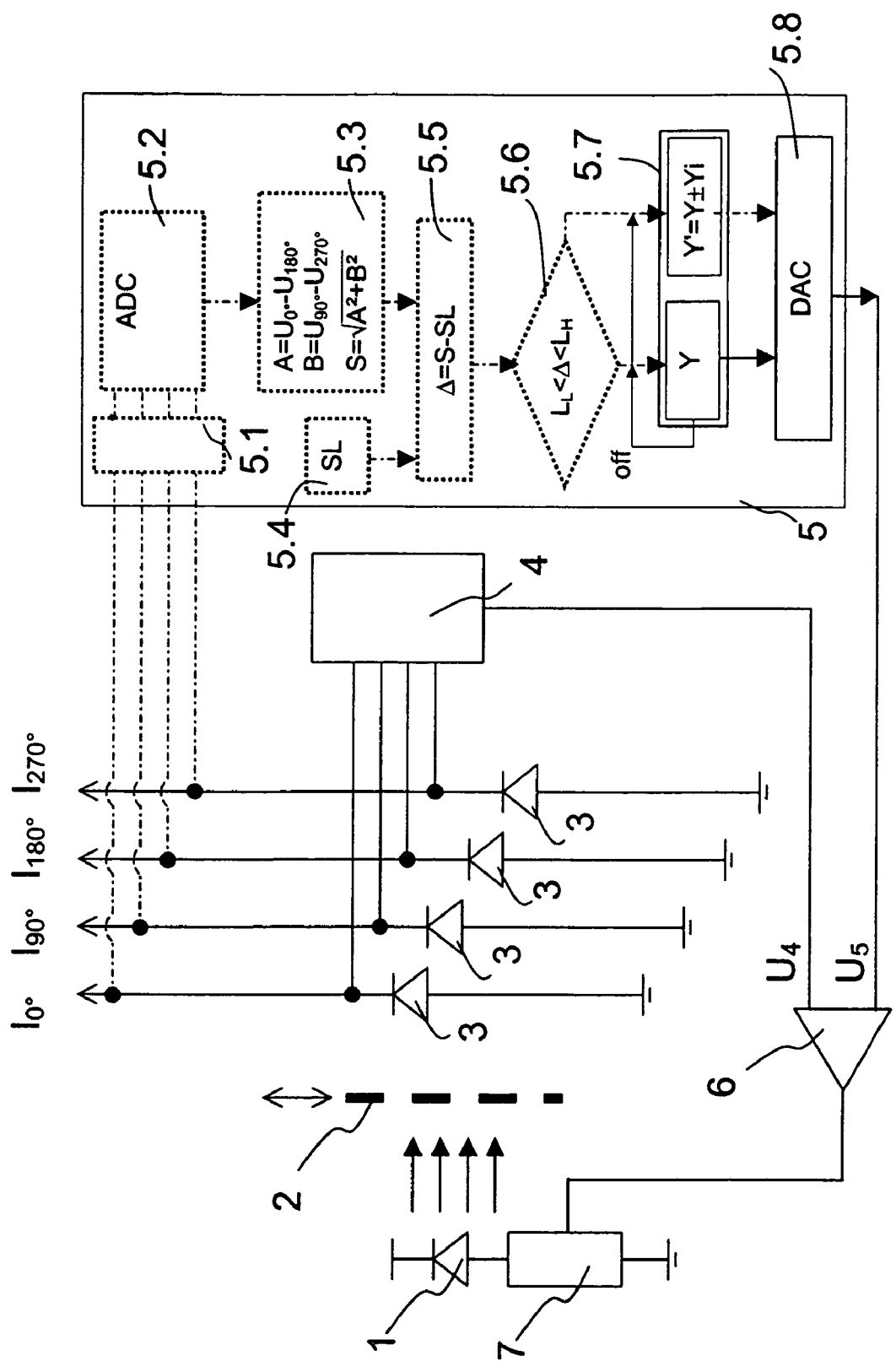
FIG. 1 is a schematic view of an exemplary embodiment of to the present invention.

In the description of the exemplary embodiments, for clarity, equally acting components are furnished with the same reference numerals.

FIG. 1 schematically illustrates the construction of a position-measuring unit having the regulation according to an example embodiment of the present invention. In this context, a light source is illustrated which, in the exemplary embodiment, is arranged as an LED 1. Opposite the LED 1 there is a measuring standard device in the form of a transparent scale 2, on which opaque graduation lines have been applied. In addition, the position-measuring unit has four photodetectors 3, scale 2 located between photodetectors 3 and the LED 1. Photodetectors 3 in the example illustrated are integrated into a semiconductor element, e.g., into an ASIC.

In the exemplary embodiment illustrated, a comparatively simple arrangement of the optical elements is described. The device hereof may also be used in position-measuring units having substantially more complex optical systems.

Figure 2:
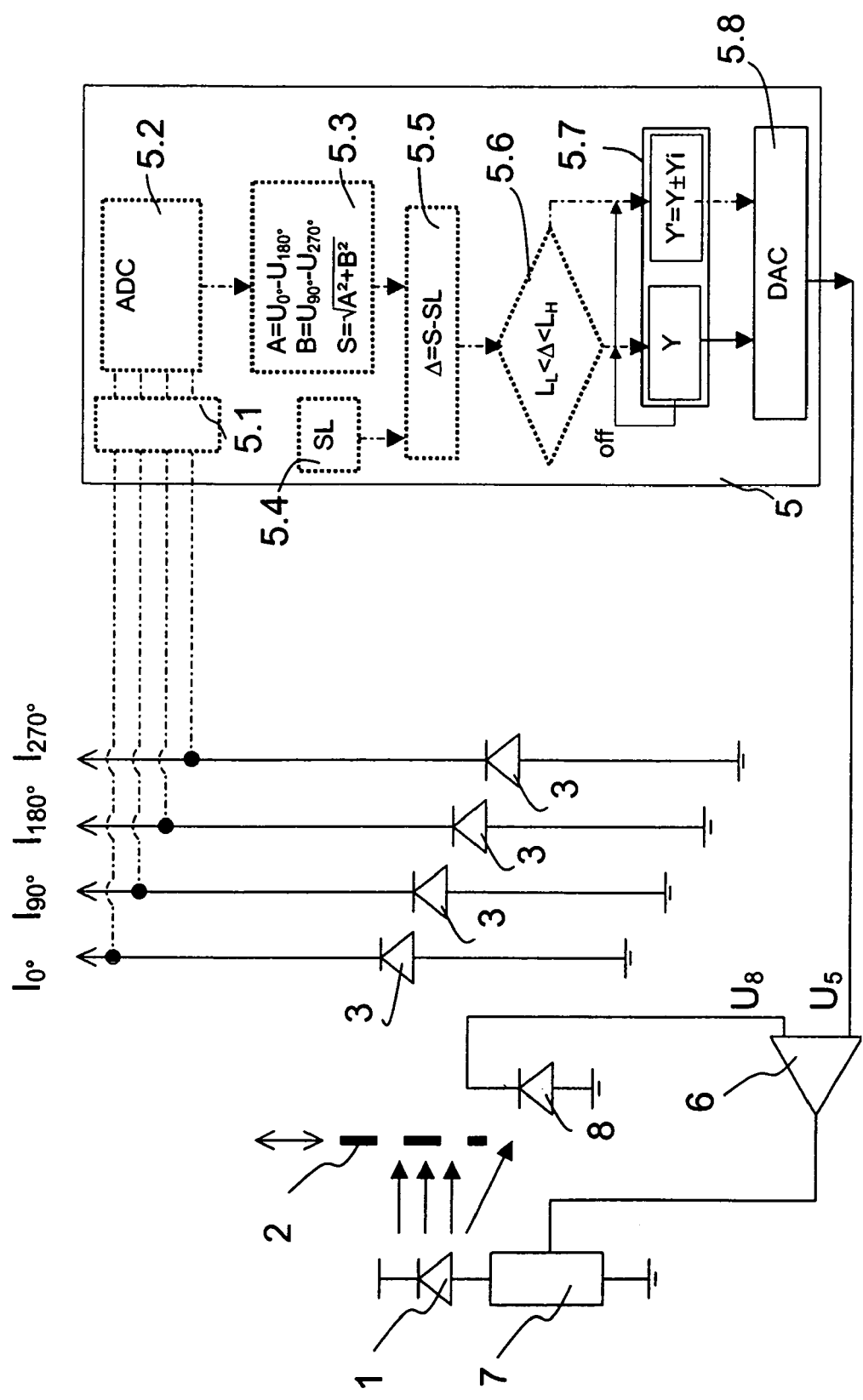
FIG. 2 is a schematic view of an exemplary embodiment of to the present invention.

In FIGS. 1 and 2, scale 2 is movable relative to LED 1 in the direction of the double arrow, the relative position between scale 2 and LED 1 measured by the position-measuring unit. To accomplish this, the light emitted by LED 1 is modulated by scale 2 as a function of position, and is converted in photodetectors 3 into position-dependent photocurrents $I_{0°}$, $I_{90°}$, $I_{180°}$, $I_{270°}$. The position-dependent photocurrents $I_{0°}$, $I_{90°}$, $I_{180°}$, $I_{270°}$ may have a sinusoidal curve and have a phase offset of 90° in each case. After that, the position-dependent photocurrents $I_{0°}$, $I_{90°}$, $I_{180°}$, $I_{270°}$ are processed further in an evaluation electronics system, so that finally the position data to be determined are generated. The device hereof is not limited to systems in which exactly four photodetectors 3 are used, or in which four photocurrents $I_{0°}$, $I_{90°}$, $I_{180°}$, $I_{270°}$ are evaluated. In this regard, for example, two or three photodetectors and, correspondingly, two or three position-dependent photocurrents may also be drawn upon for evaluation.

The average photocurrent that is formed from the sum of all position-dependent photocurrents $I_{0°}$, $I_{90°}$, $I_{180°}$, $I_{270°}$ may be constant in the ideal case. However, if, for instance, the intensity of LED 1 decreases, the average photocurrent will also be reduced. In particular, if scale 2 is soiled, for example, by a liquid film, it may still turn out that the average value of position-dependent photocurrents $I_{0°}$, $I_{90°}$, $I_{180°}$, $I_{270°}$ remains nearly unchanged compared to the ideal case, but the degree of modulation of position-dependent photocurrents $I_{0°}$, $I_{90°}$, $I_{180°}$, $I_{270°}$ is greatly reduced. That means that ranges in which in the ideal case hardly any light is incident, which should thus be dark, for instance, because of scattering effects, are brighter by this time. By contrast, ranges that are bright become darker by the soiling. The deviations in the extremes of the position-dependent photocurrents $I_{0°}$, $I_{90°}$, $I_{180°}$, $I_{270°}$ from the average photocurrent thus become less, or rather, the degree of modulation is reduced. A reduced degree of modulation may lead to worse, or rather, lower measuring signal amplitudes. Especially in connection with soiling, which may lead to a reduction in the degree of modulation, conventional position-measuring units are believed to have considerable disadvantages.

In the exemplary embodiment illustrated in FIG. 1, a summation voltage is formed, using a summation generator 4, by an analogous method based on position-dependent photocurrents $I_{0°}$, $I_{90°}$, $I_{180°}$, $I_{270°}$, which is used at the same time as actual value $U_4$ in the control circuit for regulating the intensity of LED 1. This actual value $U_4$ is supplied to a comparator, which is arranged in the form of a difference amplifier 6, and is used there as actual value for regulating LED 1.

Setpoint value $U_5$ required for regulating the intensity of LED 1 is determined with the aid of a device for generating a setpoint value $U_S$, in the example illustrated, with the aid of a circuit 5. Physically, the setpoint value $U_S$ may be seen as an electrical voltage. In the example illustrated, circuit 5 is on the same ASIC on which photodetectors 3 are also arranged.

The functioning method of circuit 5 and its elements is explained below. After the position-measuring unit is switched on, first of all position-dependent photocurrents $I_{0°}$, $I_{90°}$, $I_{180°}$, $I_{270°}$ are converted in a current-to-voltage converter 5.1 into photovoltages $U_{0°}$, $U_{90°}$, $U_{180°}$, $U_{270°}$. These electrical signals in the form of photovoltages $U_{0°}$, $U_{90°}$, $U_{180°}$, $U_{270°}$, which consequently are based on position-dependent photocurrents $I_{0°}$, $I_{90°}$, $I_{180°}$, $I_{270°}$ are then digitized in an analog-to-digital converter 5.2, i.e., reformed into digital values. From these digital values, which correspond to photovoltages $U_{0°}$, $U_{90°}$, $U_{180°}$, $U_{270°}$, a first difference $A=U_{0°}$, $U_{180°}$ and a second difference $B=U_{90°}-U_{270°}$ are formed. These differences A and B are squared in a calculating module 5.3, and the corresponding sum of the squares is determined. Thereafter, the square root is taken of the sum of the squares, so that, as a result of this transformation, a pointer or vector length $S(s=\sqrt{A^2+B^2})$ is determined that is actually present in the operation of the position-measuring unit.

In the next step, a previously stored value of a setpoint pointer length SL is read out from a storage element, e.g., an EPROM 5.4. In the exemplary embodiment illustrated, the setpoint pointer length SL is permanently stored during the configuration of the position-measuring unit, that is, before its actual use for measuring. The value of setpoint pointer length SL is then not changed any more over the entire service life of the position-measuring unit.

The specified value of setpoint pointer length SL is subtracted from the actually present pointer length S in a difference calculator 5.5 so that the difference $\Delta=S-SL$ is calculated.

In a comparator 5.6 it is checked whether difference $\Delta$ is within specified limits or not. Thus it is queried whether $\Delta$ is greater than a lower specified limit $L_L$ or whether $\Delta$ is smaller than an upper specified limit $L_H$. In general, in the first iterative step, an unacceptably large deviation will be present, so that to a setpoint value Y (in the first iteration step a default value is specified here) a value Yi is added or subtracted, depending on whether the value $\Delta$ is above or below the limits $L_H$ or L. The new setpoint value Y'=Y±Yi is then stored in setpoint value memory 5.7. This new setpoint value Y' is converted in a digital to analog converter 5.8 into an analog setpoint value $U_S$ (electrical voltage) which, as described above, is based on position-dependent photocurrents $I_{0°}$, $I_{90°}$, $I_{180°}$, $I_{270°}$.

Alternatively to this method for determining the actually present pointer length S, the so-called summation current method, for example, may also be used, in which the pointer length S is ascertained on the basis of the sum of position-dependent photocurrents $I_{0°}$, $I_{90°}$, $I_{180°}$, $I_{270°}$.

Thereafter, the analog setpoint value $U_S$ is supplied to difference amplifier 6, where it is compared to actual value $U_4$, so that a system deviation is generated for regulating the intensity of the LED 1. The systems deviation, which, as seen physically, also represents a voltage, is present at a control element, in the exemplary embodiment a transistor 7, e.g., at the base of transistor 7. With respect to this system deviation, that height or amplitude of the current sets in, which will be fed to LED 1. As is conventional, the intensity of the light emitted by LED 1 is a function of the level of the current fed into LED 1.

Corresponding to the change thus undertaken of the light intensity, the amplitudes of position-dependent photocurrents $I_{0°}$, $I_{90°}$, $I_{180°}$, $I_{270°}$ also change. This leads to a change in the value of the actually present pointer length S.

As soon as it is determined by comparator 5.6, after running through one or more iteration steps, that in difference calculator 5.5 the difference $\Delta$ between the actually present pointer length S and the specified value of setpoint pointer length SL is within the specified limits, a corresponding setpoint value Y is stored in setpoint memory over a certain time. In the example illustrated, setpoint value Y will remain unchanged until the position-measuring unit is next switched on. That means, that from this point in time until the next switching-on procedure of the position-measuring unit, the circuit elements indicated by dotted lines are no longer active. In the exemplary embodiment illustrated, in each case after switching on the position-measuring unit, setpoint value $U_S$ is checked and, if necessary, after several iteration steps, an appropriate value Y is stored, so that setpoint value $U_S$ remains unchanged until the next switching-on procedure in the control circuit for regulating the intensity of LED 1.

In an example embodiment of the present invention, setpoint value Y may also be checked permanently during the operation of the position-measuring unit. In this context, a determination of setpoint value Y, dependent on an interpolation point, may be undertaken at specified time intervals, such as every 68 µs, or instead position-dependent, e.g., setpoint value Y may be determined every 100 signal periods.

However, the regulation may also be configured such that, if comparator 5.6 determines too great a difference $\Delta$ between the actually present pointer length S and the specified value of setpoint pointer length SL, during operation, only an alarm is triggered. In the case of the alarm, the position-measuring unit is to be started anew, so that consequently the repeated determination and storage of a changed setpoint value Y in setpoint value memory 5.7 is undertaken together with the starting procedure.

FIG. 2 illustrates an example embodiment of the present invention. In this context, photodetectors 3, 8 are arranged such that light modulated by scale 2 is converted by a partial number of the photodetectors into position-dependent photocurrents $I_{0°}$, $I_{90°}$, $I_{180°}$, $I_{270°}$. Thus, the determination of setpoint value $U_S$ is based only on photocurrents $I_{0°}$, $I_{90°}$, $I_{180°}$, $I_{270°}$ of a partial number of the photodetectors, e.g., photodetectors 3. Furthermore, in this exemplary embodiment setpoint value $U_S$ is determined using the same circuit 5 as in the previously-described exemplary embodiment.

A difference from the previously described exemplary embodiment is that, in this exemplary embodiment, the non-modulated light of LED 1 is converted into a photocurrent by a photodetector 8, this photocurrent representing the basis for actual value $U_8$. This means that, for the regulation of the intensity of LED 1 an actual value $U_8$ is used, which is, in the final analysis, generated by photodetector 8, which receives light emitted by LED 1, that is not modulated in a position-dependent manner by scale 2.

The actual value $U_8$ is supplied to difference amplifier 6, as in the previously described exemplary embodiment, where a comparison is performed between actual value $U_8$ and setpoint value $U_S$, so that a system deviation is ascertained for regulating the intensity of LED 1. In this context, the system deviation is applied in the form of a voltage to the base of transistor 7, so that LED 1 is, in the final analysis, supplied with an electric current whose level is a function of the system deviation.

In this exemplary embodiment, no summation formation of several photocurrents has to be undertaken for the determination of actual value $U_8$, but rather, in this case, the constant light proportion is directly determined using photodetector 8.

In the exemplary embodiments illustrated, the setpoint value $U_5$ is in each case determined by a digital method. However, exemplary embodiments of the present invention also include systems and/or methods in which setpoint value $U_5$ is determined by an analog circuit.

What is claimed is:

1. A device for regulating a light source of a position-measuring unit, comprising:
   a measuring standard device movable relative to the light source;
   a plurality of photodetectors configured to convert light emitted by the light source into photocurrents, the photocurrent of at least one photodetector usable to form an actual value, photodetectors arranged to convert light modulated by at least a partial number of the photodetectors into position-dependent photocurrents;
   a device configured to generate a setpoint value based on a vector length of the position-dependent photocurrents; and
   a comparator, in a control circuit for regulating an intensity of the light source, configured to compare the actual value and the setpoint value to generate a system deviation based on photocurrents.

2. The position-measuring unit according to claim 1, wherein the device configured to generate the setpoint value includes a calculation module configured to form the vector length.

3. The position-measuring unit according to claim 1, wherein the device configured to generate the setpoint value includes an analog-to-digital converter configured to digitize signals that are based on the position-dependent photocurrents.

4. The position-measuring unit according to claim 3, wherein the device configured to generate the setpoint value includes a digital-to-analog converter configured to provide an analog setpoint value.

5. The position-measuring unit according to claim 1, wherein the photodetectors and the device configured to generate the setpoint value are integrated in a semiconductor element.

6. A device for regulating a light source of a position-measuring unit, comprising:
   a measuring standard device movable relative to the light source;
   a plurality of photodetectors positioned to convert light modulated by the measuring standard device to position-dependent photocurrents, the position-dependent photocurrent of at least one photodetector usable to form an actual value;
   a device configured to generate a setpoint value based on a vector length of the position-dependent photocurrents; and
   a comparator, in a control circuit for regulating an intensity of the light source, configured to compare the actual value and the setpoint value to generate a system deviation based on photocurrents.

7. The position-measuring unit according to claim 6, wherein the device configured to generate the setpoint value includes a calculation module configured to form the vector length.

8. The position-measuring unit according to claim 6, wherein the device configured to generate the setpoint value includes an analog-to-digital converter configured to digitize signals that are based on the position-dependent photocurrents.

9. The position-measuring unit according to claim 8, wherein the device configured to generate the setpoint value includes a digital-to-analog converter configured to provide an analog setpoint value.

10. The position-measuring unit according to claim 6, wherein the photodetectors and the device configured to generate the setpoint value are integrated in a semiconductor element.

11. A device for regulating a light source of a position-measuring unit, comprising:
    a measuring standard device movable relative to the light source;
    a plurality of photodetectors arranged to convert light modulated by the measuring standard device into position-dependent photocurrents;
    a photodetector configured to convert light emitted by the light source to a position-independent photocurrent usable to form an actual value;
    a device configured to generate a setpoint value based on a vector length of the position-dependent photocurrents; and
    a comparator, in a control circuit for regulating an intensity of the light source, configured to compare the actual value and the setpoint value to generate a system deviation based on photocurrents.

12. The position-measuring unit according to claim 11, wherein the device configured to generate the setpoint value includes a calculation module configured to form the vector length.

13. The position-measuring unit according to claim 11, wherein the device configured to generate the setpoint value includes an analog-to-digital converter configured to digitize signals that are based on the position-dependent photocurrents.

14. The position-measuring unit according to claim 13, wherein the device configured to generate the setpoint value includes a digital-to-analog converter configured to provide an analog setpoint value.

15. The position-measuring unit according to claim 11, wherein the photodetectors and the device configured to generate the setpoint value are integrated in a semiconductor element.

16. A method for regulating a light source of a position-measuring unit, comprising:
    converting light emitted from the light source by photodetectors into photocurrents, at least one part of the emitted light modulated by a measuring standard device movable relative to the light source to generate position-dependent photocurrents by the modulated light and based on at least a partial number of the photodetectors;
    generating an actual value based on at least one of the photocurrents;
    generating a setpoint value based on a vector length of the position-dependent photocurrents; and
    comparing, in a control circuit for regulating an intensity of the light source, the actual value to the setpoint value to generate a system deviation based on photocurrents.

17. The method according to claim 16, wherein the actual value is generated in the actual value generating step by an analog method.

18. The method according to claim 16, wherein the actual value is generated in the actual value generating step based on a sum of the photocurrents.

19. The method according to claim 16, wherein the setpoint value generating step includes digitizing electrical signals that are based on the position-depending photocurrents.

20. The method according to claim 16, wherein the setpoint value generating step includes forming the vector length.

21. The method according to claim 20, further comprising:

comparing the vector length to a predefined value of a setpoint vector length; and changing the setpoint value until a difference between the vector length and the setpoint vector length is between predefined limits.

22. The method according to claim 19, wherein the setpoint value generating step includes performing a digital-to-analog conversion of digitized values after the digitizing step and after further processing to generate the setpoint value.

* * * * *